(12) United States Patent
Fisher et al.

(10) Patent No.: US 9,650,133 B2
(45) Date of Patent: May 16, 2017

(54) POWER AND COMMUNICATION INTERFACE FOR VERTICAL TAKE-OFF AND LANDING (VTOL) UNMANNED AERIAL VEHICLES (UAVS)

(71) Applicant: AeroVironment, Inc., Simi Valley, CA (US)

(72) Inventors: Christopher Eugene Fisher, Leo, IN (US); Jason Sidharthadev Mukherjee, Simi Valley, CA (US); William Arden Lott, Simi Valley, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 0 days.

(21) Appl. No.: 15/042,090

(22) Filed: Feb. 11, 2016

(65) Prior Publication Data

US 2017/0021923 A1 Jan. 26, 2017

Related U.S. Application Data

(60) Provisional application No. 62/115,372, filed on Feb. 12, 2015.

(51) Int. Cl.
*B64C 27/22* (2006.01)
*B64C 29/02* (2006.01)
*B64C 39/02* (2006.01)
*B64F 1/00* (2006.01)

(52) U.S. Cl.
CPC ............ *B64C 29/02* (2013.01); *B64C 39/024* (2013.01); *B64F 1/005* (2013.01); *B64C 2201/088* (2013.01); *B64C 2201/18* (2013.01); *B64C 2201/201* (2013.01)

(58) Field of Classification Search
USPC ..... 244/100 E, 7 B, 115, 1 R, 135 A, 110 R; 701/3
See application file for complete search history.

(56) References Cited

U.S. PATENT DOCUMENTS

| | | | |
|---|---|---|---|
| 2,479,125 A | 8/1949 | Leonard | |
| 2,750,133 A * | 6/1956 | Lebold | B64C 25/32 244/100 R |
| 4,890,802 A | 1/1990 | Burgess et al. | |
| 8,418,959 B2 | 4/2013 | Kang et al. | |
| 8,708,277 B1 * | 4/2014 | McGeer | B64C 25/68 244/110 C |
| 9,139,310 B1 * | 9/2015 | Wang | B64F 1/36 |
| 9,174,733 B1 * | 11/2015 | Burgess | B64D 1/12 |
| 9,448,562 B1 * | 9/2016 | Sirang | G05D 1/0676 |
| 9,499,265 B2 * | 11/2016 | Sanz | B64F 1/02 |
| 2009/0236470 A1 | 9/2009 | Goossen et al. | |
| 2014/0217242 A1 | 8/2014 | Muren et al. | |

(Continued)

OTHER PUBLICATIONS

International Search Report and Written Opinion for serial No. PCT/US2016/17627 mailed May 12, 2016.

*Primary Examiner* — Christopher P Ellis
(74) *Attorney, Agent, or Firm* — Brooks Acordia IP Law, P.C.; Michael Zarrabian; Eric Aargaard

(57) ABSTRACT

A vertical take-off and landing (VTOL) unmanned aerial vehicle (UAV) system including: a rearward facing tang extending from a rear fuselage portion of a VTOL UAV; one or more metallic contacts disposed on an exterior surface of the tang; a UAV pod including a landing surface; and an opening disposed in the landing surface to receive the tang.

11 Claims, 7 Drawing Sheets

(56) References Cited

U.S. PATENT DOCUMENTS

| | | | |
|---|---|---|---|
| 2015/0069968 A1* | 3/2015 | Pounds | B60L 11/1818 320/109 |
| 2016/0039541 A1* | 2/2016 | Beardsley | B60L 11/1816 701/2 |
| 2016/0144982 A1* | 5/2016 | Sugumaran | B64C 25/32 244/103 R |

* cited by examiner

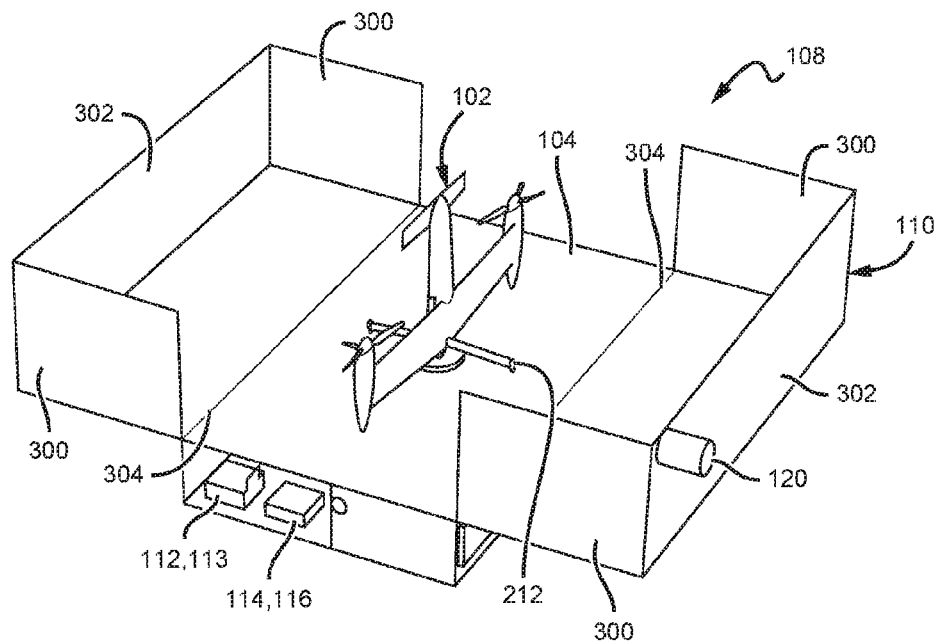
FIG. 3A
FIG. 3B
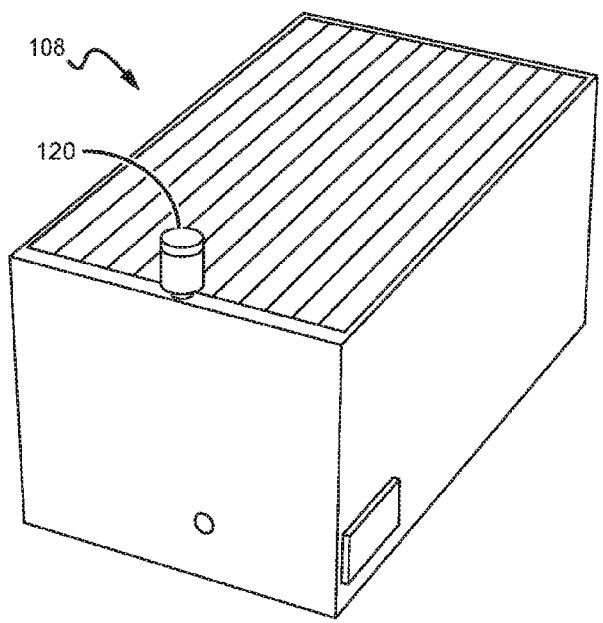

POWER AND COMMUNICATION INTERFACE FOR VERTICAL TAKE-OFF AND LANDING (VTOL) UNMANNED AERIAL VEHICLES (UAVS)

CROSS-REFERENCE TO RELATED APPLICATIONS

This application claims priority to and the benefit of U.S. Provisional Patent Application No. 62/115,372, filed Feb. 12, 2015, the contents of which are hereby incorporated by reference herein for all purposes.

BACKGROUND

Technical Field

The field of the invention relates to unmanned aerial vehicle (UAV) systems, and more particularly to systems for operating a UAV autonomously.

Description of the Related Art

Aerial geographic survey work for the agricultural and oil industries incur the logistics and costs of personnel to operate and maintain the air vehicle as well as collect and process the associated data. These costs are typically compounded by need for a substantial amount of this work to be performed at, or relatively near to, the location of the survey, which typically is well removed from any population centers. As a result, it is advantageous to increase automation, reliability (reduce complexity), range, and capability of an air vehicle and support system for performing such data retrieval and processing tasks.

SUMMARY

A vertical take-off and landing (VTOL) unmanned aerial vehicle (UAV) system a rearward facing tang extending from a rear fuselage portion of a VTOL UAV, one or more metallic contacts disposed on an exterior surface of the tang, a UAV pod comprising a landing surface and an opening disposed in the landing surface to receive the tang. The opening in the landing surface may include slanted sides to aid in guiding the tang as the VTOL UAV lands on the landing surface. Alternatively, the opening disposed in the landing surface may be at least one of: an orifice, a slot, and a channel. The system may also include a locking armature disposed in the opening disposed in the landing surface, wherein the locking armature detachably couples the tang to the UAV pod. In such embodiments, the locking armature may slidably engages the tang and/or rotate the VTOL UAV, via the detachably coupled tang, relative to the UAV pod. The tang may include a notch to receive a portion of the locking armature. The opening disposed in the landing surface may include one or more metallic contacts, wherein the one or more metallic contacts of the opening are aligned with the one or more metallic contacts disposed on the exterior surface of the tang. In such embodiments, the one or more metallic contacts disposed in the landing surface and the one or more metallic contacts disposed on the exterior surface may be at least one of: power contacts and data contacts. In other embodiments, the one or more metallic contacts disposed in the landing surface may slidably engage the aligned one or more metallic contacts disposed on the exterior surface of the tang. The tang may include a bulbous end.

A method may include receiving a rearward facing tang extending from a rear fuselage portion of a vertical take-off and landing (VTOL) unmanned aerial vehicle (UAV) in an opening disposed in a landing surface of a UAV pod and securing the tang of the VTOL UAV to the UAV pod via a locking armature disposed in the opening disposed in the landing surface so that the locking armature detachably couples the tang to the UAV pod. In such embodiments, the method may include sliding the receiver apparatus into a secured position, with such a sliding step optionally including receiving a portion of the locking armature in a notch of the tang. The method may also include rotating the VTOAL UAV, via the secured tang, relative to the UAV pod. In such embodiments, the rotating the VTOL UAV step may also include aligning the VTOL UAV with wind conditions for launch and/or aligning one or more metallic contacts disposed in the opening disposed in the landing surface with one or more metallic contacts disposed on an exterior surface of the tang. In embodiments, the method may include sliding a power contact of the one or more metallic contacts disposed in the opening to touch a power contact of the one or more metallic contacts disposed on the exterior surface of the tang. The method may also include sliding a data contact of the one or more metallic contacts disposed in the opening to touch a data contact of the one or more metallic contacts disposed on the exterior surface of the tang or transferring data, via a data contact of the one or more metallic contacts disposed in the opening aligned with a data contact of the one or more metallic contacts disposed on the exterior surface of the tang, between a UAV pod processor and a VTOL UAV processor. In such embodiments, the transferred data may include at least one of: a plurality of flight mission information, waypoints, altitude, flight speed, sensor suite configuration data, launch day, launch time, and mission weather sensor go and no-go parameters. Additionally, the method may include transferring power, via a power contact of the one or more metallic contacts disposed in the opening aligned with a power contact of the one or more metallic contacts disposed on the exterior surface of the tang, between a UAV pod battery and a VTOL UAV battery.

A device may include an opening disposed in a landing surface to receive a rearward facing tang extending from a rear fuselage portion of a VTOL UAV and a locking armature disposed in the opening disposed in the landing surface, wherein the locking armature detachably couples the tang to the landing surface. The UAV pod may include the landing surface.

The opening in the landing surface may include slanted sides to aid in guiding the tang as the VTOL UAV lands on the landing surface. The locking armature may slidably engage the tang. In certain embodiments, the locking armature may rotate the VTOL UAV, via the detachably coupled tang, relative to the landing surface. The opening disposed in the landing surface may include one or more metallic contacts, wherein the one or more metallic contacts of the opening are aligned with one or more metallic contacts disposed on an exterior surface of the tang. In such embodiments, the one or more metallic contacts disposed in the landing surface and the one or more metallic contacts disposed on the exterior surface are at least one of: power contacts and data contacts. The one or more metallic contacts disposed in the landing surface may slidably engage the aligned one or more metallic contacts disposed on the exterior surface of the tang. The tang may include a bulbous end. The tang may include a notch to receive a portion of the locking armature.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIGS. 3A and 3B illustrate the UAV pod in its open and closed configurations, respectively;

DETAILED DESCRIPTION

A vertical takeoff and landing (VTOL) unmanned aerial vehicle (UAV) system is disclosed that provides for improved remote geographic survey capabilities. Multiple autonomous mission launches and landings may be accomplished using a two-rotor VTOL UAV that is capable of efficient horizontal flight, and a UAV pod having a UAV pod processor, with the UAV selectively enclosed in the UAV pod for protection against the external environment when not in use, recharging and/or transferring data.

A power and data interface on the UAV is described that may be a rearward-facing tang disposed on a rear portion of the fuselage of a UAV to fit into an opening on a landing surface in a UAV pod. The tang may have a bulbous end and/or a notch that may be received by a locking armature. The locking armature may detachably secure the tang to the UAV pod. The locking armature may also be used to rotate the tang, and connected UAV, to a desired orientation for storage in the UAV pod. The tang and opening may have corresponding connections for power and data, which may be used to transfer missions to the UAV, flight data from the UAV, and power to the UAV.

Exemplary UAV Pod and UAV Structure

Figure 1:
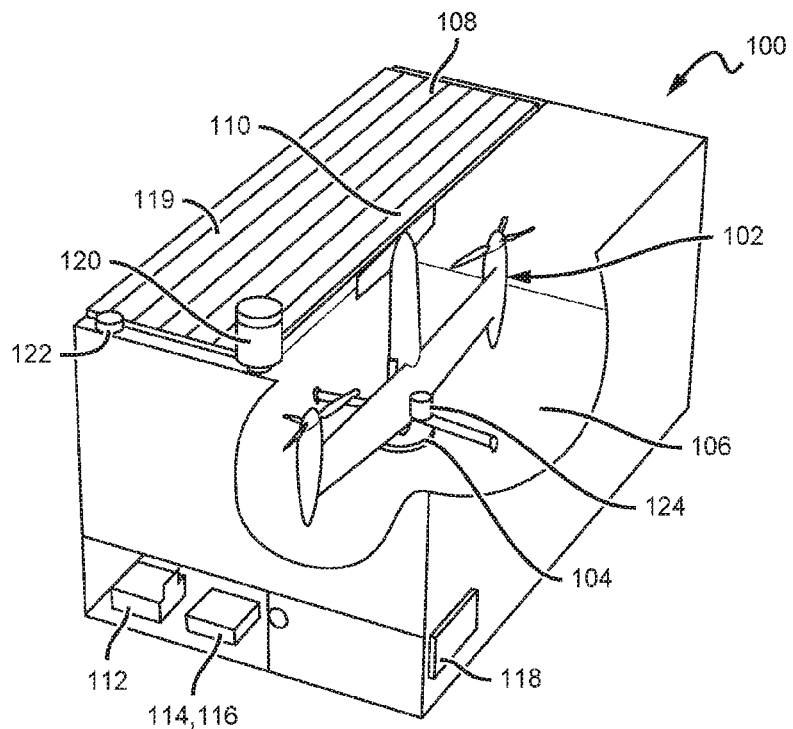
FIG. 1 is a perspective view of one embodiment of a UAV pod that may house and protect an extended range VTOL UAV to accomplish multiple autonomous launches, landings and data retrieval missions.

FIG. 1 is a perspective view of one embodiment of a UAV pod that may house and protect an extended range VTOL UAV to accomplish multiple autonomous launches, landings and data retrieval missions. The illustrated system 100 has a winged two rotor UAV 102 seated on a landing surface 104 of an interior 106 of the UAV pod 108. The UAV 102 is seated in a vertical launch position to facilitate later launch out of the UAV pod 108. The UAV pod 108 may selectively enclose the UAV 102, such as through the use of a UAV pod protective cover 110. The cover 110 may be a two-part hinged cover that is operable to close to protect the UAV 102 from the external environment or to open to enable launch of the UAV 102. The UAV pod 108 may have a short-range UAV pod transceiver 112 that may be seated in a compartment below the landing surface 104, within their own separate compartments, or may be seated elsewhere within the UAV pod 108 for protection from the external environment. The UAV pod transceiver 112 may receive UAV flight telemetry such as UAV flight and trajectory information, UAV battery status information and sensor data (such as video), and other data transmitted by the UAV 102. The UAV pod transceiver 112 may also transmit flight control data such as navigation (e.g., re-routing instructions) to the UAV 102. A UAV pod processor 114 may also be housed within the UAV pod 108 to accomplish, among other functions, providing the UAV 102 with a plurality of missions, receiving flight survey data from the UAV 102, monitoring the UAV pod 108 for overhead obstacles, monitoring the external environment such as the weather through the weather sensor, monitoring the trajectory of the UAV 102, and providing navigation instructions to the UAV 102 in response to receiving UAV battery status or other flight warning condition data inputs.

A UAV pod memory 116 may also be housed within the UAV pod 108 for storing UAV flight mission information and geographic survey data. A battery 118 may be enclosed in the UAV pod for recharging the UAV 102 and for providing power to the UAV pod 108 such as for use by the processor 114 and cover motor (not shown). The battery 118 may be rechargeable such as through solar panels 119, or may be a permanent battery such as a 12-Volt deep cycle marine battery. In an alternative embodiment, the battery 118 may be a fuel cell. In some embodiments, the UAV pod 108 will use the solar panels 119 to charge the battery 118 to later charge the battery of the UAV 102. Typically, the UAV pod 108 will be charging the battery 118 while the UAV 102 is out of the pod 108 executing a mission and will recharge the UAV 102 upon its return to the UAV pod 108.

A weather sensor 120 in communication with the UAV pod processor 114 may extend from an exterior of the UAV pod 108 to enable accurate measurement of the external environment, such as wind speed, temperature and barometric pressure. A proximity sensor or sensors may also be provided (122, 124) and in communication with the UAV pod processor 114 to enable go and no-go flight decisions based on the proximity of any objects or other obstructions positioned over the UAV pod cover 110. The UAV pod 108 is preferably weather hardened to enable extended outdoor use regardless of weather variations.

Figure 2A:
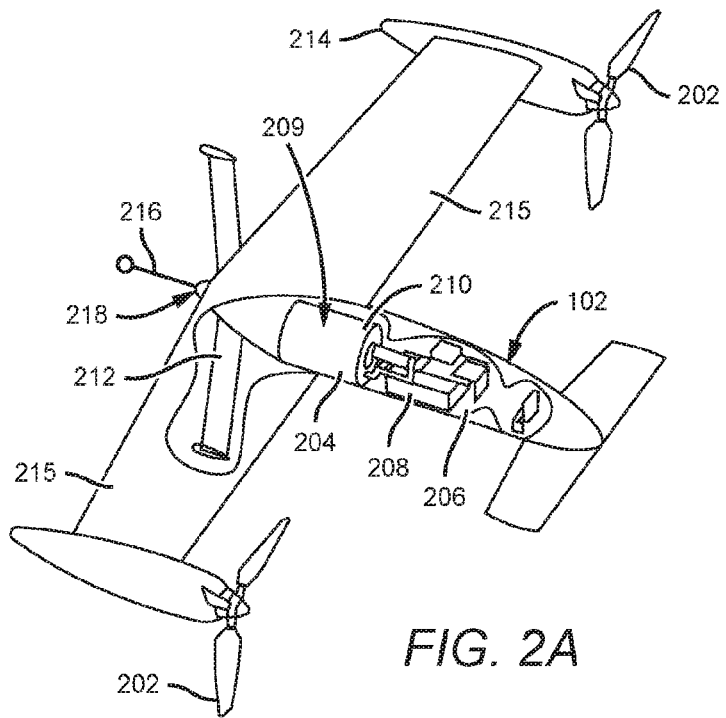
FIG. 2A is a perspective view of the two-rotor UAV first illustrated in FIG. 1.

FIG. 2A is a perspective view of the two-rotor UAV 102 first illustrated in FIG. 1. The UAV 102 has only two rotors 202, enabling vertical takeoff and landing (VTOL) missions out of the UAV pod 108 (see FIG. 1). The UAV 102 has a UAV transceiver 204 within a UAV fuselage 206. A UAV processor 208 is also seated in the UAV 102 and in communication with the UAV transceiver 204. The UAV 102 also includes a battery 209 for providing power to the rotor motors and the electronics, including the processor 208. The UAV processor 208 is configured to receive a plurality of flight mission information that may include waypoints, altitude, flight speed, sensor suite configuration data, launch day/time and mission weather sensor go and no-go parameters. The UAV 102 may have a variety of electrical optical (EO) sensors 210, such as LiDAR, RADAR, infrared, visible-spectrum cameras, or other active or passive sensors that may be used to detect soil moisture, crop density, crop health, terrain, or other objects or qualities of interest. The UAV 102 may have a rear landing gear 212 extending off of a rear of the fuselage 206 that may be used in combination with UAV engine nacelles 214 to enable a four-point landing for more stable landings on the UAV pod 108 (see FIG. 1). The landing gear 212 may also function as a flight surface or aerodynamic surface, such as a vertical stabilizer, providing corrective (passive) forces to stabilize the UAV 102 in flight, such as to stabilize in a yaw direction. The UAV 102 may have wings 215 to provide the primary source of lift during the UAV cruise (e.g., horizontal flight), while the two rotors 202 provide the primary source of lift during the VTOL phases of UAV flight. This combination of wing and rotor use allows for efficient flight while collecting flight survey data, which increases the range and/or duration of a particular flight while also allowing the UAV 102 to land and take off from the relatively small UAV pod 108 (see FIG. 1) landing area. In one embodiment, the UAV 102 may take off and land vertically using the two rotors 202 that themselves are operable to lift the UAV 102 vertically upwards, transition the UAV 102 to horizontal flight to conduct its survey or other flight mission, and then transition it back to vertical flight to land the UAV 102 vertically downwards, with attitudinal control for the UAV 102 in all modes of flight (vertical and horizontal) coming entirely from the rotors 202 (as driven by a means of propulsion) without the benefit or need of aerodynamic control surfaces, such as ailerons, an elevator, or a rudder. One such UAV 102 is described in international patent application number PCT/US14/36863 filed May 5, 2014, entitled "Vertical Takeoff and Landing (VTOL) Air Vehicle" and is incorporated by reference in its entirety herein for all purposes. Such a UAV 102 benefits from a more robust structure by reducing the opportunity for damage to control surfaces (i.e., there aren't any), and may be made lighter and with less complexity.

Figure 2B:
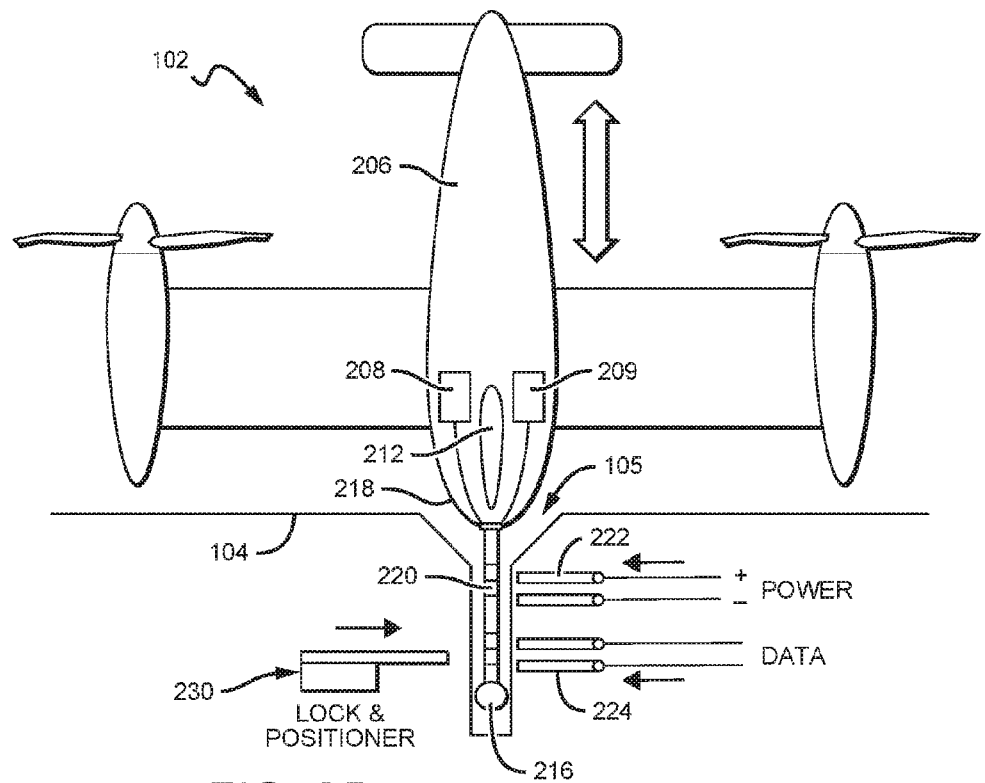
FIG. 2B depicts a landing surface including an orifice, slot, channel or other opening to receive and detachably couple the tang to the UAV pod as the UAV lands.

The UAV 102 may also be provided with a rearward facing tang 216 extending off of a rear portion 218 of the fuselage 206 in lieu of or in addition to rear landing gear 212. Such rearward-facing tang 216 may be metallic or have metallic contacts for receipt of electrical signals (i.e., data) and/or power for charging the UAV's battery 209. As shown in FIG. 2B, in such an embodiment, the landing surface 104 would include an orifice, slot, channel or other opening 105 to receive and detachably couple the tang 216 to the UAV pod 108 as it lands. The channel 105 includes slanted slides at its top opening to aid in guiding the tang 216 as the UAV 102 lands. The tang 216 may be used to secure the UAV 102 to the landing surface 104 via a locking armature 230. The locking armature 230 includes a lock to secure the tang 216 (as shown about a bulbous end) and can include a mechanism to position the UAV 102 via a rotation of the tang 216 to position for either closing of the pod doors or for aligning the UAV 102 with the wind for take-off. Alternately, the landing surface 104 may also be rotatable, such as configured as a turntable, to better position the UAV for enclosing in the pod or landing and launch in adverse wind conditions. The locking armature 230, as shown, can slide into position once the tang 216 is positioned in the channel 105 (e.g., when the UAV 102 has landed), or the locking armature 230 can be any of a variety of other mechanical configurations to catch the tang 216. Power contacts 222 and data contacts 224 can be slid or otherwise positioned to touch contacts 220 formed on the tang 216. The data contacts 224 are in electrical communication with the UAV's electronics, such as the processor 208, and the power contacts 222 are in communication with the UAV's battery 209.

Figure 2C:
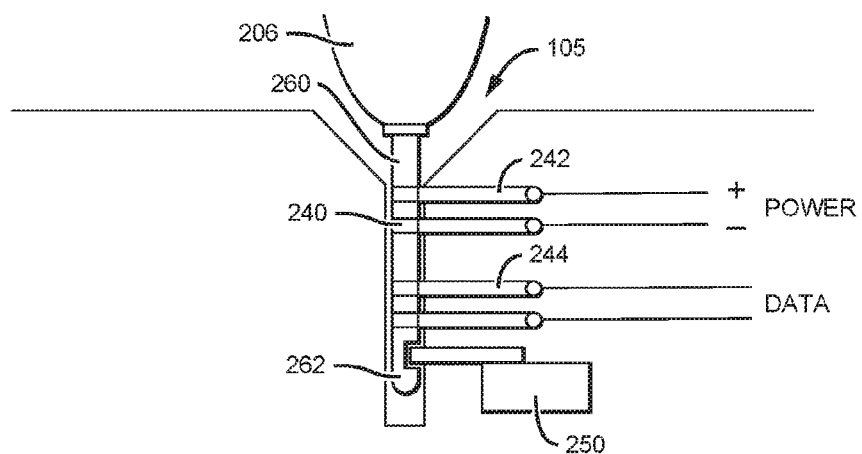
FIG. 2C depicts the length of the tang that can be sized to form fit the channel without a bulbous end on the tang.

As shown in FIG. 2C, in embodiments, the length of the tang 260 can be sized to form fit the channel 105 without a bulbous end on the tang. The tang 260 may include a notch 262 which can receive a portion of a receiving, locking, or securing mechanism 250 to hold the UAV 102 in place. In the illustrated embodiment, the mechanism 250 is a rigid sliding or rotatable lock that slidably or rotatably enters into the square notch 262 thereby prohibiting the tang 260 from sliding up and out of the channel 105 until the mechanism is removed from the notch 262. Although the notch 262 is illustrated as being established along a limited circumference of the tang 260, in other embodiments the notch may extend around an entire perimeter of the tang 260. In further embodiments, the square notch 262 is not square, but rather has a partially or fully arcuate axial surface. The mechanism may be slightly elastic to elastically and slidably engage the notch 262, rather than being slidably driven into the notch 262, as the tang is lowered into the channel 105. The mechanism may be operable to rotate the tang 260, thus rotating the UAV to a different angular orientation relative to the UAV pod. The tang 260 includes electrical contacts 240 for contact with power contacts 242 and data contacts 244.

FIGS. 3A and 3B illustrate the UAV pod 108 in its open and closed configurations, respectively. In FIG. 3A, the UAV 102 is illustrated in its vertical configuration and seated on a landing surface 104 of the UAV pod 108. The UAV 102 is shown positioned at least generally aligned with the rectangular dimensions of the UAV pod 108. In embodiments, the landing surface 104 is rotatable to position the UAV. In FIG. 3A, the cover 110 is open to enable unobstructed launch, and later landing, of the UAV 102. The cover 110 is illustrated with side portions 300 and top portions 302, with hinges 304. In an alternative embodiment, only the top portions 302 are hinged to enable unobstructed launch of the UAV 102. Alternatively, the top portions 302 may translate out of the flight path linearly or using a mechanism and motion so that the UAV is free to launch. In one embodiment, the landing gear 212 may be omitted and the UAV 102 may be guided into and out of one or more slots, guide rails, channels, or other guiding structure to both secure the UAV 102 during its landed state and enable landing. The weather sensor 120 may be coupled to the cover 110 or may extend off the side of the UAV pod 108 (not shown). Also, although the UAV pod 108 is illustrated having a rectangular cross-section and a box-like structure, the UAV pod 108 may take the form of a dome-shaped structure or other configuration that enables stable placement and protection for the selectively enclosed UAV. The cover 110 can include solar panels on its exterior (not shown), and in some embodiments one or both of the covers 110 can be positioned, and moved, about the hinges 304 to be perpendicular to the sun's rays to maximize the collection of solar energy. In other embodiments, the short-range UAV pod transceiver 112 may also have features of or include a long-range UAV pod transceiver 113 for communication with a cellular tower.

Business Methods of Operation

Figure 4:
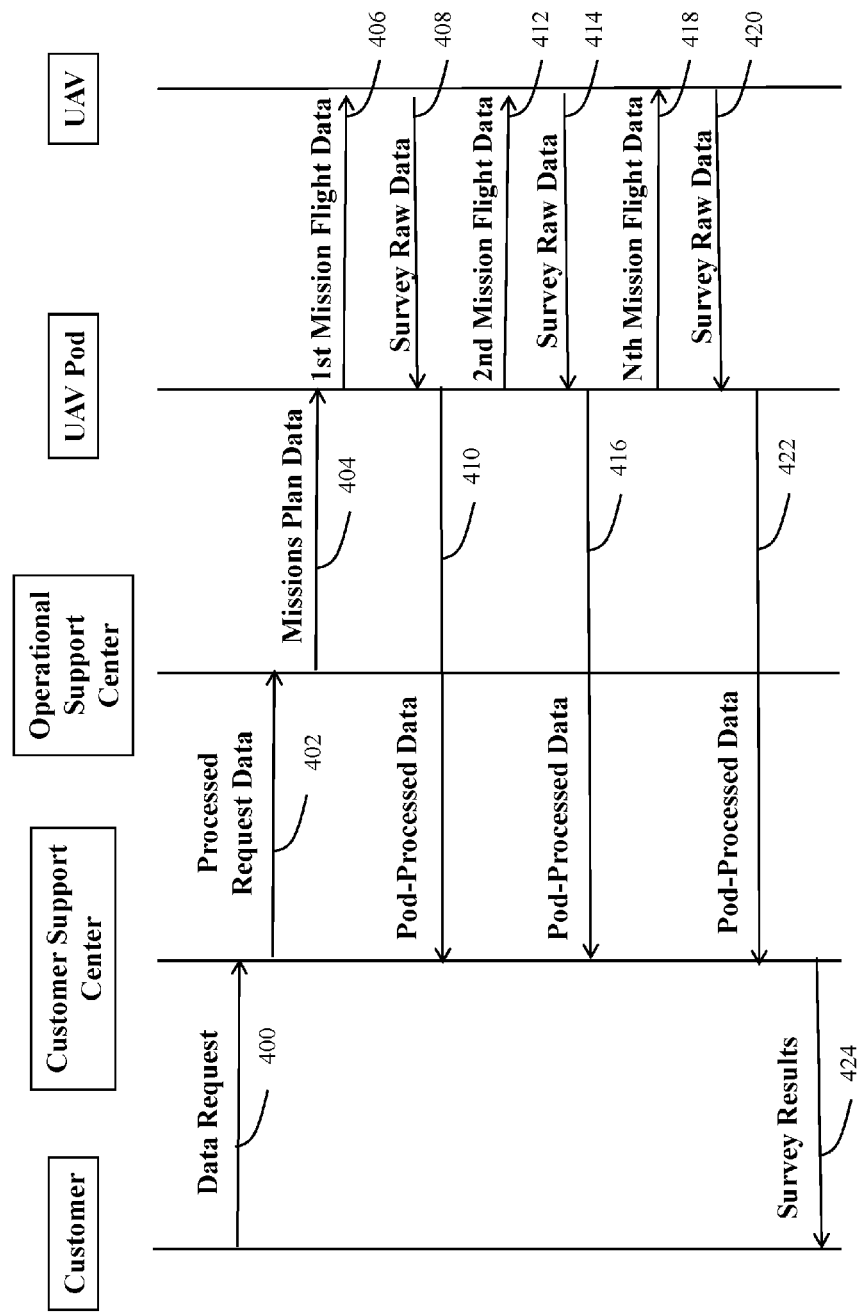
FIG. 4 is a data flow diagram illustrating information flow from a customer requesting data to a customer support center, an operational support center, a UAV in a UAV pod, and back again.

FIG. 4 is a data flow diagram illustrating information flow from a customer requesting data to a customer support center, an operational support center, a UAV in a UAV pod, and back again. A customer may submit a data request 400, such as a request for a geographic aerial survey, to a customer support center. The customer support center may work with the customer and the received data to finalize the data request for transmission 402 to an operational support center. The operational support center may use the finalized data request to determine the location of a launch site in or adjacent to a UAV pod survey site, to plan a plurality of flight missions that collectively accomplish the customer's geographic survey data request. The resultant missions plan data may then be provided 404 to a UAV pod that may be deployed to the launch site. Prior to launch, the first of the plurality of missions is provided to the UAV 406 in the form of flight data, such as altitude, heading, and way points, and the UAV is launched to perform the mission. Upon return of the UAV to the UAV pod, the survey raw data, such as camera imagery, event logs, GPS and IMU raw data, may be provided 408 to the UAV pod. In one embodiment, the UAV pod may pre-process the data, such as by converting the raw data into viewable JPGs with an accompanying geospatial location. Additional pre-processing may be performed, such as stitching the images into an orthomosaic. In a further embodiment, such pre-processing may be performed onboard the UAV prior to providing the data to the UAV pod. The pre-processed data may be provided 410 to the customer support center for final processing.

The next mission's flight data may be provided 412 to the UAV and the UAV may be launched to perform the next survey mission. Upon its return, the survey raw data may be provided 414 to the UAV pod for pre-processing and the pre-processed data may then be provided 416 to the customer support center for additional processing. With the UAV receiving the last mission flight data 418 and upon receipt by the UAV pod of the final survey raw data 420, the final pod-processed data may be provided 422 to the customer support center. After final processing of the collective missions pre-processed data, the survey results may be provided 424 by the customer support center to the customer.

Figure 5:
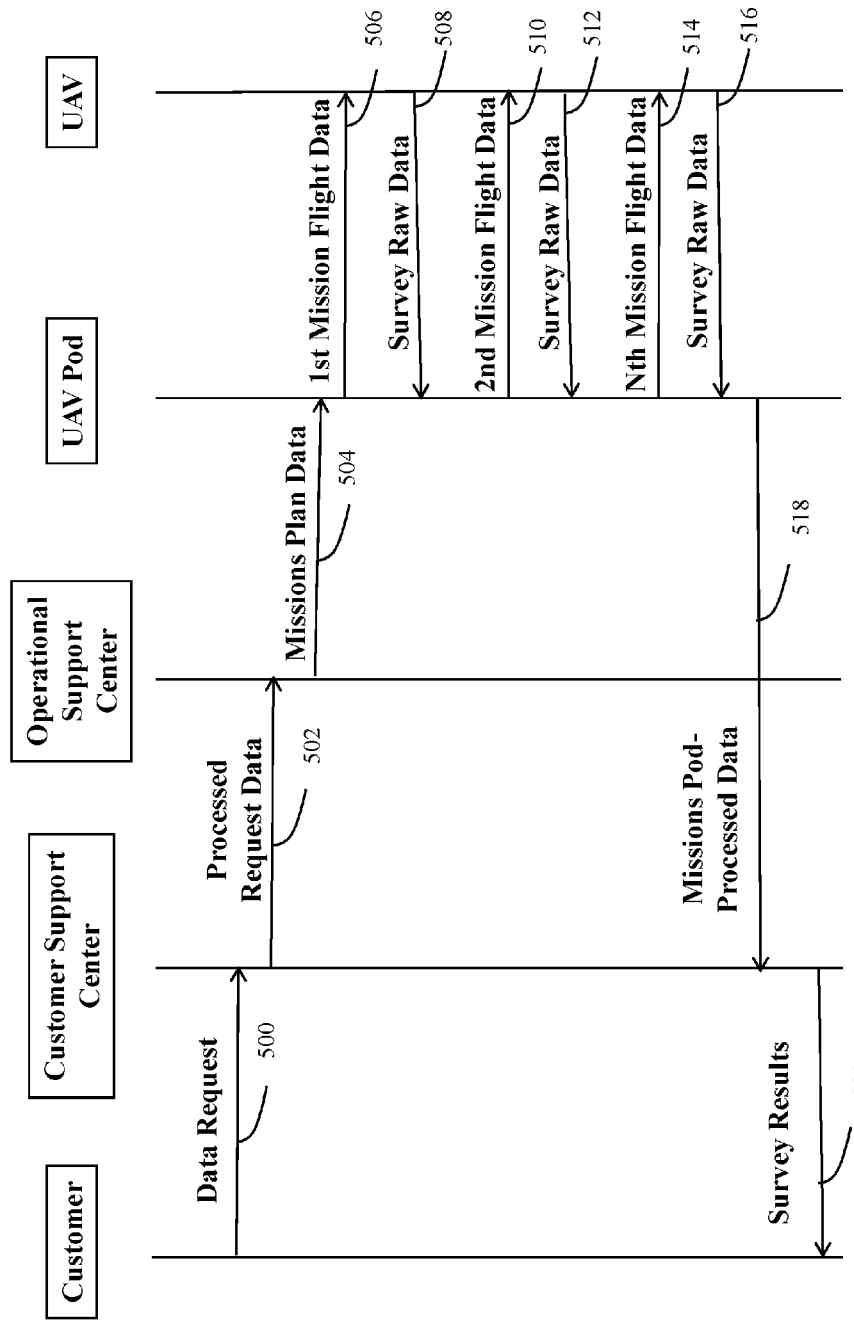
FIG. 5 is a data flow diagram illustrating another embodiment of the flow of information from a customer requesting data, to a customer support center, to an operational support center, to a UAV in a UAV pod, and back again to the customer.

FIG. 5 is a data flow diagram illustrating another embodiment of the flow of information from a customer requesting data, to a customer support center, to an operational support center, to a UAV in a UAV pod, and back again to the customer. As illustrated above, the customer may submit the data request 500 to the customer support center that may then finalize the data request for transmission 502 to an operational support center. The processed requested data is used to develop a plurality of flight missions that collectively accomplish the customer's data request. The resultant missions plan data may then be provided 504 to the UAV pod that may be deployed to the launch site, and the first mission's flight data may be provided 506 to the UAV prior to launch and accomplishment of the first flight survey mission. The pre-processed survey data may be provided 508 to the UAV pod for storage, and the second mission's flight data provided 510 to the UAV to conduct the second mission's survey. Upon returning to the UAV pod, the second mission's pre-processed flight data may be provided 512 to the UAV pod. After the last mission's flight data is provided 514 to the UAV by the UAV pod and after conclusion of the last flight mission survey, the last mission's flight survey data may be provided 516 to the UAV pod and the collective missions' pod-processed survey data provided 518 to the customer support center for final processing before providing 520 the finally-processed survey data to the customer.

Figure 6:
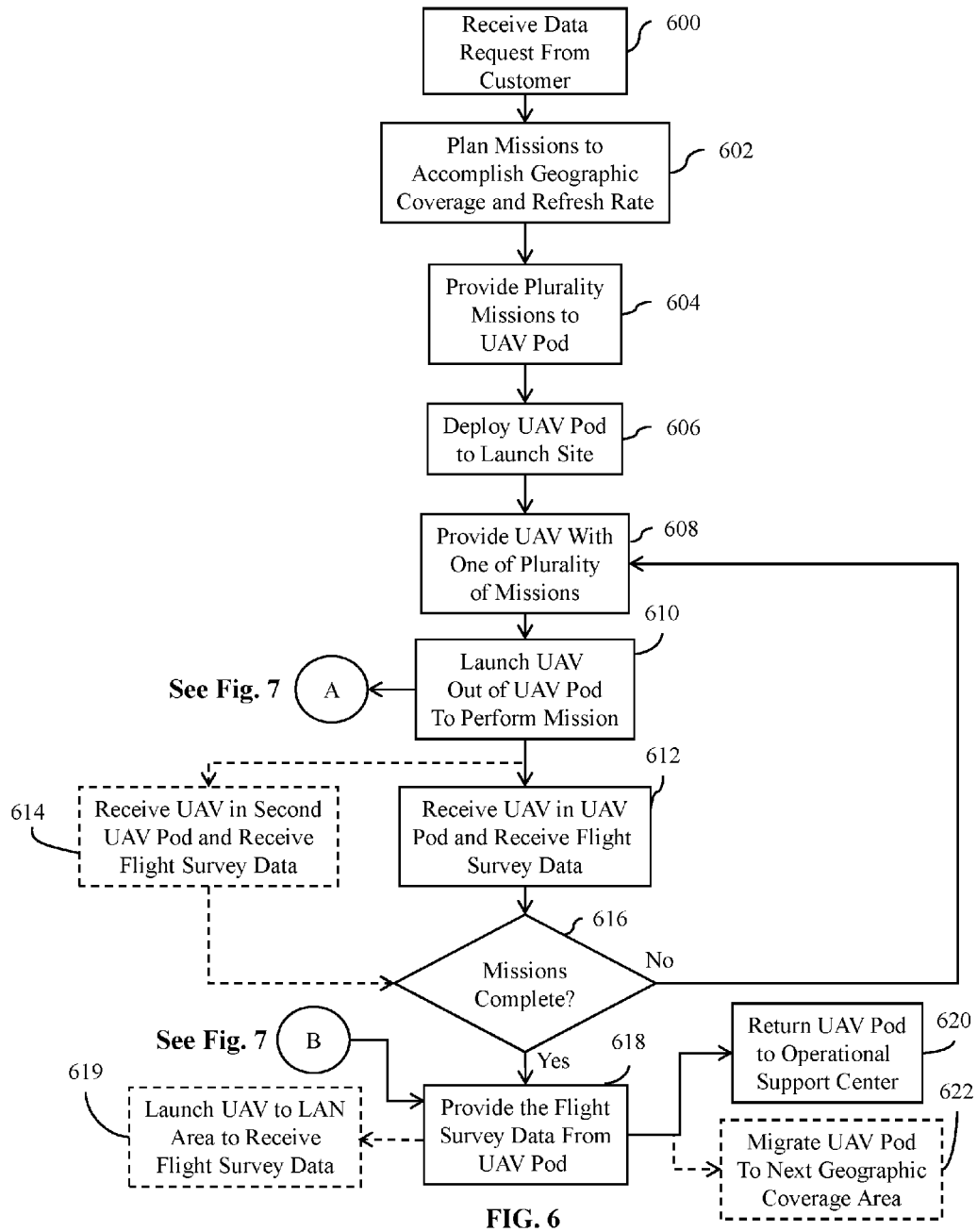
FIG. 6 is a flow diagram illustrating a more particular embodiment of use of the UAV pod and UAV system by a customer.

FIG. 6 is a flow diagram illustrating a more particular embodiment of use of the UAV pod and UAV system by a customer. A first data request is received from a customer, such as an owner of an agricultural field or land use manager (block 600). The customer may input the data request through a website portal that requests information detailing the request. For example, the customer may wish to provide geographic boundaries to survey a first geographic coverage area during a specific period of time to accomplish a refresh rate. "Refresh rate" refers to the number of times each area of the geographic coverage area is imaged during the deployment period for that geographic coverage area. In other embodiments, the data request may include a ground resolution or ground surface distance ("GSD"). For example, a GSD of one inch may enable the coverage areas and refresh rates described in Table 1.

TABLE 1

|  | Example 1 | Example 2 | Example 3 |
| --- | --- | --- | --- |
| UAV Deployment Period | 90 days | 90 days | 90 days |
| UAV Missions | 360 | 360 | 360 |
| GSD | 1 inch | 1 inch | 1 inch |
| Coverage Area | 100,000 | 12,500 | 6,250 |
| Refresh Rate | 1 (once/90 days) | 8 (once/11 days) | 16 (once/6 days) |

Similarly, by suitably modifying GDS values, the UAV may have the coverage area and refresh rates listed in Table 2.

TABLE 2

|  | Example 4 | Example 5 | Example 6 | Example 7 |
| --- | --- | --- | --- | --- |
| UAV Deployment Period | 90 days | 90 days | 90 days | 90 days |
| UAV Missions | 360 | 360 | 360 | 360 |
| GSD | 2 inch | 4 inch | 0.5 inch | 0.25 inch |
| Coverage Area (acres) | 100,000 | 12,500 | 50,000 | 25,000 |
| Refresh Rate | 2 (once/45 days) | 4 (once/23 days) | 1 (once/90 days) | 1 (once/90 days) |

In other embodiments, rather than inputting the data request through a website portal, the customer may provide the data through a proprietary software interface or via a telephone interview mechanism, each in communication with a customer support center. A plurality of flight missions may then be planned that collectively accomplish the customer's (block 602) request such as by pre-planning how many flights and from what general areas they need to operate. The planned flight missions, such flight missions including flight mission data representing takeoff day/time, waypoints, flight altitudes, flight speeds, and such, are provided to the UAV pod (block 604) for future communication to a UAV seated in the UAV pod.

The UAV pod may then be deployed to a launch site that is either within or adjacent to the customer-desired geographic coverage area (block 606). Deployment may consist of loading the UAV into a UAV pod and transporting both to the launch site by means of truck or aircraft transport. By way of further example, the UAV pod and enclosed UAV may be transported by a commercial carrier (e.g., FedEX, UPS, etc.) to a farm for offloading into a field, or by an oil and gas utility company to a location adjacent a transmission or pipeline that may be the subject of a visual survey. The UAV may be provided with flight mission data representing one of the plurality of missions (block 608) such as by short range wireless or wired communication within the UAV pod. The UAV may then be launched out of the UAV pod to perform the provided flight mission (block 610). As described herein, a "mission" or "flight mission" preferably encompasses one launch, survey flight, and landing, but may encompass more than one launch/flight/landing. The flight mission data may also include dynamic flight instructions, such as altering its trajectory, attitude or such as by dropping a payload if certain conditions exist, such as would be valuable in a search and rescue mission if the plan locates the sought after object or person.

After completion of the flight mission, or in response to a rerouting request received by the UAV, the UAV is received in the UAV pod and the flight survey data is provided to UAV pod memory (block 612). In an alternative embodiment, rather than returning to the original UAV pod, the UAV flies to and is received by a second UAV pod (block 614). Such an alternative embodiment may be utilized in order to transition the UAV into an adjacent geographic survey region for receipt of a new plurality of missions for a second geographic survey. Alternatively, such an embodiment may be used to provide for an extended geographic area survey, one that would ordinarily not be accomplished with a single UAV due to the UAVs inherent power/range limitation. If all missions in the plurality of missions have not yet been completed (block 616), then the next one of the plurality of missions is provided to the UAV (block 608) and the UAV is again launched out of the UAV pod autonomously (i.e., without human intervention) to perform the next survey flight mission and the UAV may return to the UAV pod after completing the flight mission and the recorded survey data provided to the UAV pod. Otherwise, if all missions are completed (block 616), then the completed flight survey data may be provided from the UAV pod (block 618). The survey data may be provided to UAV pod memory that is in the form of detachable memory in the UAV pod, such as SD cards, USB flash memory, or otherwise detachable and portable memory, to a UAV pod servicer, or may be provided wirelessly through a cell phone connection, WLAN or LAN connection, or satellite-enabled transceiver. In an alternative embodiment, the UAV is routed to a LAN area for the LAN to receive the flight survey data wirelessly during flight and before returning for landing in the UAV pod (block 619).

The flight survey data provided to UAV pod memory (perhaps detachable memory), provided wirelessly from the UAV pod, or even provided to a local LAN as described above, may be in raw or pre-processed form. For example, the flight survey data may simply be "zipped" and relayed to a remote processing station where all of the data is processed. Pre-processing the flight survey data prior to providing such from the UAV pod or directly from the UAV provides advantages. Data transmission bandwidth requirements may be reduced from what would otherwise be needed to transmit raw data for processing to an operational support center. A reduction in transmission bandwidth requirements may translate into reduced data transmission costs and time. In a preferred embodiment, either the UAV processor 208 (see FIG. 2A) or UAV pod processor 114 (see FIG. 1) may pre-process the UAV-captured raw data (e.g., block 418, see FIG. 4). The UAV-captured raw data such as camera imagery, event logs, GPS and IMU raw data may be converted into viewable JPGs with accompanying geospatial location (i.e., "geo-tagging") for transmission. However, additional pre-processing may be performed either by the UAV processor or UAV pod processor. For example, the JPG images and accompanying geospatical location may be further processed to stitch the images into an orthomosaic so that what is sent from the UAV pod or from the UAV itself is a single high resolution image covering the entire flight survey area (or from an individual flight mission) resulting in the lowest bandwidth needed for transmission and the highest level of automation of pre-processing for the ultimate customer for measuring roads, buildings, fields, identifying agricultural progress, inspecting infrastructure, urban planning, and other analysis.

As shown in FIG. 6, the UAV pod (which may now include the UAV) may then be retrieved and returned to an operations support center (block 620). A second plurality of flight missions may then be uploaded into the UAV pod to accomplish a second data request from the same or a different customer and the UAV pod re-deployed. In an alternative embodiment, rather than returning the UAV pod to a support center, the UAV pod may be moved or migrated (block 622) to a second or next geographic coverage area for further use.

In a further alternative embodiment, the UAV pod may be deployed to a launch site prior to providing the UAV pod with flight missions data representing the planned flight missions. In such a scheme, the UAV pod may establish or join a local LAN connection for receipt of the planned flight missions on-site.

Local UAV Operation

Figure 7:
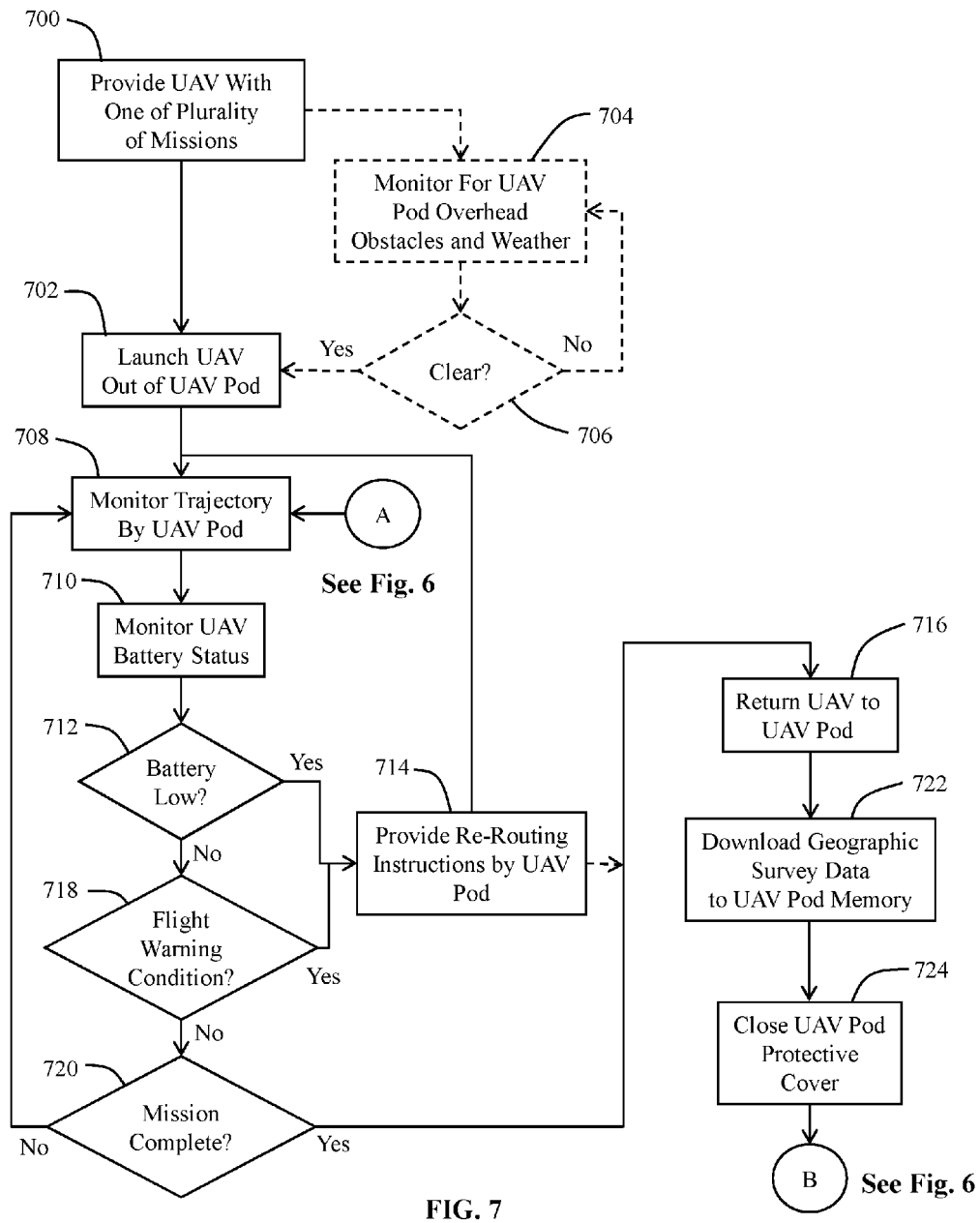
FIG. 7 is a flow diagram illustrating one embodiment of a method of conducting flight missions for the UAV.

FIG. 7 is a flow diagram illustrating one embodiment of a method of conducting flight missions for the UAV. The UAV may be provided with one of the plurality of missions (block 700) that reside in the UAV pod. The UAV may be launched vertically out of the UAV pod (block 702), preferably under its own power using the two rotors on the UAV. In one embodiment, the immediate environment over the UAV pod is monitored for obstacles and weather (block 704) that may otherwise interfere with launch of the UAV. In such an embodiment, if no obstructions are detected (block 706), then the UAV may be launched out of the UAV pod (block 702). Otherwise, launch of the UAV is delayed or cancelled and the UAV pod continues to monitor for overhead obstacles and weather (block 704, 706), as well as the UAV battery status (block 710). After launch, the UAV pod may monitor the UAV's trajectory (block 708). If UAV battery power is low or otherwise drops below a predetermined voltage threshold (block 712), then the UAV pod may provide rerouting instructions to the UAV (block 714) to shorten the current mission to enable a safe return of the UAV to the UAV pod. In an alternative embodiment, the UAV is directed to return immediately to the UAV pod (block 716) or to an intermediate pre-determined position. If, however, the battery is not low (block 712), and no other flight warning condition is triggered (block 718) the mission continues (block 720). If the current UAV mission has been completed (block 720), the UAV returns to the UAV pod (block 716) for landing and the geographic survey data is downloaded to the UAV pod memory (block 722) such as by a wireless or wired transfer of the mission data to the UAV pod memory. The UAV pod protective cover may be closed (block 724) to protect the UAV from the external environment (i.e., rain, direct sun, vandals, or damaging particulate matter).

While various embodiments of the invention have been described, it will be apparent to those of ordinary skill in the art that many more embodiments and implementations are possible that are within the scope of this invention.

What is claimed is:

1. A vertical take-off and landing (VTOL) unmanned aerial vehicle (UAV) system comprising:
   a rearward facing tang extending from a rear fuselage portion of a VTOL UAV;
   one or more metallic contacts disposed on an exterior surface of the tang;
   a UAV pod comprising a landing surface; and
   an opening disposed in the landing surface to receive the tang.

2. The system of claim 1 wherein the opening in the landing surface comprises slanted sides to aid in guiding the tang as the VTOL UAV lands on the landing surface.

3. The system of claim 1 wherein the opening disposed in the landing surface is at least one of: an orifice, a slot, and a channel.

4. The system of claim 1 further comprising:
   a locking armature disposed in the opening disposed in the landing surface, wherein the locking armature detachably couples the tang to the UAV pod.

5. The system of claim 4 wherein the locking armature slidably engages the tang.

6. The system of claim 4 wherein the locking armature rotates the VTOL UAV, via the detachably coupled tang, relative to the UAV pod.

7. The system of claim 4 wherein the tang comprises a notch to receive a portion of the locking armature.

8. The system of claim 4 wherein the opening disposed in the landing surface comprises one or more metallic contacts, wherein the one or more metallic contacts of the opening are aligned with the one or more metallic contacts disposed on the exterior surface of the tang.

9. The system of claim 8 wherein the one or more metallic contacts disposed in the landing surface and the one or more metallic contacts disposed on the exterior surface are at least one of: power contacts and data contacts.

10. The system of claim 8 wherein the one or more metallic contacts disposed in the landing surface slidably engage the aligned one or more metallic contacts disposed on the exterior surface of the tang.

11. The system of claim 1 wherein the tang comprises a bulbous end.

* * * * *